(12) United States Patent
Olson (10) Patent No.: US 7,051,230 B2
(45) Date of Patent: May 23, 2006

(54) METHOD AND SYSTEM FOR ALLOWING CUSTOMIZATION OF REMOTE DATA COLLECTION IN THE EVENT OF A SYSTEM ERROR

(75) Inventor: John Thomas Olson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 10/197,904

(22) Filed: Jul. 18, 2002

(65) Prior Publication Data

US 2004/0015742 A1    Jan. 22, 2004

(51) Int. Cl.
*G06F 11/00* (2006.01)

(52) U.S. Cl. .............. 714/2; 714/25; 714/38; 714/4; 717/124; 707/202

(58) Field of Classification Search ........... 714/2, 714/25, 37, 38, 42, 45, 47, 48, 4; 707/202; 717/124
See application file for complete search history.

(56) References Cited

U.S. PATENT DOCUMENTS

| | | | |
|---|---|---|---|
| 5,170,304 A | 12/1992 | Katohno et al. | |
| 5,453,894 A | 9/1995 | Kim et al. | |
| 5,469,318 A | 11/1995 | Inoue et al. | |
| 5,701,224 A | 12/1997 | Sakui | |
| 5,793,580 A | 8/1998 | Argumedo et al. | |
| 5,906,656 A | 5/1999 | Keller et al. | |
| 5,930,089 A | 7/1999 | Anderson | |
| 6,029,258 A * | 2/2000 | Ahmad | 714/46 |
| 6,043,949 A | 3/2000 | Sakui | |
| 6,084,733 A * | 7/2000 | Ohzeki et al. | 360/53 |
| 6,085,244 A | 7/2000 | Wookey | |
| 6,166,881 A | 12/2000 | Anderson et al. | |
| 6,167,358 A | 12/2000 | Othmer et al. | |
| 6,208,948 B1 | 3/2001 | Klingler et al. | |
| 6,215,618 B1 | 4/2001 | Anderson et al. | |
| 6,252,739 B1 | 6/2001 | Todd et al. | |

(Continued)

FOREIGN PATENT DOCUMENTS

DE    19848618    1/2002

(Continued)

*Primary Examiner*—Robert Beausoliel
*Assistant Examiner*—Emerson Puente
(74) *Attorney, Agent, or Firm*—Jean M. Barkley; Dillon & Yudell LLP (57) ABSTRACT

In a computer system, a method and system for allowing customization of data collection in the event of a system error is described. In one embodiment, a Program Registration Table (PRT) contains entries associating a program name with an executable file and associated parameters. Additionally, an Error Matrix (EM) includes entries specifying which program(s) in the PRT to execute in response to a particular system error. In the event of a system error, the program(s) to execute is determined by examining the entries in the EM. The program(s) is then executed. The output from the program(s) executed may then be sent offsite for analysis. Changing the behavior of the machine in the event of a system error may be accomplished by updating entries in the PRT and EM, without the need to change any code on the system.

18 Claims, 7 Drawing Sheets

U.S. PATENT DOCUMENTS

| | | |
|---|---|---|
| 6,260,187 B1 | 7/2001 | Cirne |
| 6,333,831 B1 | 12/2001 | Todd |
| 6,359,751 B1 | 3/2002 | Groel, et al. |
| 6,397,244 B1 * | 5/2002 | Morimoto et al. .......... 709/200 |
| 6,401,217 B1 * | 6/2002 | Clark et al. .................... 714/20 |
| 6,553,507 B1 * | 4/2003 | Cohen ........................... 714/4 |
| 6,633,997 B1 * | 10/2003 | Kaneko ........................ 714/5 |
| 6,675,315 B1 * | 1/2004 | Semler et al. ................. 714/4 |
| 6,718,489 B1 * | 4/2004 | Lee et al. ..................... 714/43 |
| 2002/0006790 A1 | 1/2002 | Blumenstock, et al. |

FOREIGN PATENT DOCUMENTS

| | | |
|---|---|---|
| JP | 1135560 | 5/1989 |
| JP | 4001908 | 1/1992 |
| JP | 9325927 | 12/1997 |
| JP | 11328635 | 11/1999 |
| WO | WO 00/23894 | 1/2002 |

* cited by examiner

| program_tag | executable_name | attribute | attrib_value | attrib_executable |
|---|---|---|---|---|
| bc_check | /usr/bin/bc_check | concurrent_rdm | bc_check | N/A |
| | | concurrent_rdm | rdm_bc_check | N/A |
| | | freq_check | 24 | N/A |
| | | blackout_period | 1 | N/A |
| | | output_limit | 0.01 | N/A |
| oc_lvl | /usr/bin/oc_lvl | concurrent_rdm | oc_lvl | N/A |
| | | freq_check | 24 | N/A |
| | | blackout_period | 1 | N/A |
| | | output_limit | 0.01 | N/A |

Fig. 3B

| rule_tag | pre-conditions | results |
|---|---|---|
| tape_rule1 | gen_tape | bc_check, rasutil |
| tape_rule2 | gen_tape_drive | bc_check |
| gen_power_rule1 | gen_power | bc_check, oc_lvl, rasutil |
| tape_rule3 | tape_drive_power | bc_check, oc_lvl, rasutil |

Algorithm For Fire Rules

Parameters:
- firing_pattern: [first | all] - specifies whether to fire only the first rule that matches, or all of the rules that match
- num_errors: the number of error_tags that are in the check_list
- error_spacer: this is the delimiter between adjacent check_list elements (error_tags)
- check_list: string of error_tags separated by error_spacers

```
If (firing_pattern = = first) then
    Foreach X in error_matrix Do
        If (all_match(X, check_list)) then
            Result_list: = get_results(X)
            Foreach Y in result_list Do
                Run Y
            Exit successfully
Elseif (firing_pattern = = all) then
    Foreach X in error_matrix Do
        If (all_match(X, check_list)) then
            Result_list: = get_results(X)
            Foreach Y in result_list Do
                Run Y
Else
    Return error
```

Fig. 6

Algorithm For Program Registration Table Manager

Parameters:
- modification_type: [add | remove | change]
- program_tag: unique identifier for the data collection program
- executable_name: full path name of program to be run
- num_attributes: the number of performance checks that are required with the given function
- attribute_value_prog_spacer: this is the delimiter between attribute type, value, and full path name of program to run
- attribute_spacer: this is the delimiter between adjacent attribute/value/program triplets
- attributes: the string containing all of the attribute, value, program triplets, separated by attribute_spacer, and each member of each triplet separated from each other by the attribute_value_prog_spacer

```
If ((modification_type = = remove) || (modification_type = = change)) then
    If (program_tag in database) then
        If (modification_type = = remove) then
            Remove the program entry
        Else
            Change entry in database
    Else
        Return error
Elseif (modification_type = = add) then
    If (program_tag in database) then
        Return error
    Else
        Add the program entry
Else
    Return error
```

Fig. 7

Algorithm For Error Matrix Manager

Parameters:
- modification_type: [add | remove | change]
- rule_tag: unique identifier for this rule that is being added to the error matrix
- num_pre_conds: the number of pre-conditions (error_tags) in the pre-conditions list
- pre_conds_spacer: this is the delimiter between adjacent pre-conditions (error_tags)
- pre_conds: the string containing all of the pre-conditions (error_tags) separated by pre_conds_spacer
- num_results: the number of results (data collection programs (program_tags) to run) if all of the pre-conditions are true
- results_spacer: this is the delimiter between adjacent results (data collection programs)
- results: the string containing all of the results (data collection program_tags) separated by results_spacer

```
If ((modification_type = = remove) || (modification_type = = change)) then
    If (error_tag in error_matrix) then
        If (modification_type = = remove) then
            Remove the error_rule entry
        Else
            Change entry in error_matrix
    Else
        Return error
Elseif (modification_type = = add) then
    If (error_tag in error_matrix) then
        Return error
    Else
        Add the error_rule entry
Else
    Return error
```

METHOD AND SYSTEM FOR ALLOWING CUSTOMIZATION OF REMOTE DATA COLLECTION IN THE EVENT OF A SYSTEM ERROR

BACKGROUND OF THE INVENTION

1. Technical Field

The invention relates to computer systems and more particularly to collection of system data, and still more particularly to a method and system for allowing customization of data collection in the event of a system error.

2. Description of the Related Art

The use of computer systems is becoming prevalent in commercial as well as personal arenas. Despite the common use of computer systems, many users are incapable of diagnosing and correcting errors that occur. The problem of diagnosing and correcting system errors is further complicated from the fact that most systems are geographically distant from service technicians.

Currently there are two methods for capturing data to help diagnose and correct problems when an error occurs on a computer system. The first is accomplished by using static lists indicating which data to collect in the event of an error. The second method is performed by a technician remotely logging in to the troubled system and executing various diagnostic tools. Each of these methods has undesirable consequences.

If static lists are utilized, there is no way to tailor the list without updating or adding new code. Adding code to a machine that is currently in-use is a risky venture as it may cause a system to become unstable. For a technician to collect data remotely, the technician must be given access to the machine. Providing a technician access creates security issues that are undesirable when working with systems containing sensitive data.

Therefore, there is a need for a new and improved method and system for allowing customization of data collection in the event of a system error without a technician logging into the system.

SUMMARY OF THE INVENTION

As will be seen, the foregoing invention satisfies the foregoing needs and accomplishes additional objectives. Briefly described, the present invention provides an improved method and system for allowing customization of data collection in the event of a system error. In contrast to previous systems, the method and system of the present invention allow for flexible data collection without the need to update code on client machine or have a technician log into the system.

According to one aspect of the present invention, a method and system for allowing customization of data collection in the event of a system error is presented. A Program Registration Table (PRT) contains entries associating a program name with an executable file and associated parameters. Additionally, an Error Matrix (EM) includes entries specifying which program(s) in the PRT to execute in response to a particular system error. In the event of a system error, the program(s) to execute is determined by examining the entries in the EM. The program(s) is then executed. The output from the program(s) executed may then be sent offsite for analysis. Changing the behavior of the machine in the event of a system error may be accomplished by updating entries in the PRT and EM, without the need to change any code on the system.

DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Referring now to the drawing figures, in which like numerals indicate like elements or steps throughout the several views, the preferred embodiment of the present invention will be described. In general, the present invention provides for a method and system for allowing customization of data collection in the event of a system error.

Figure 1:
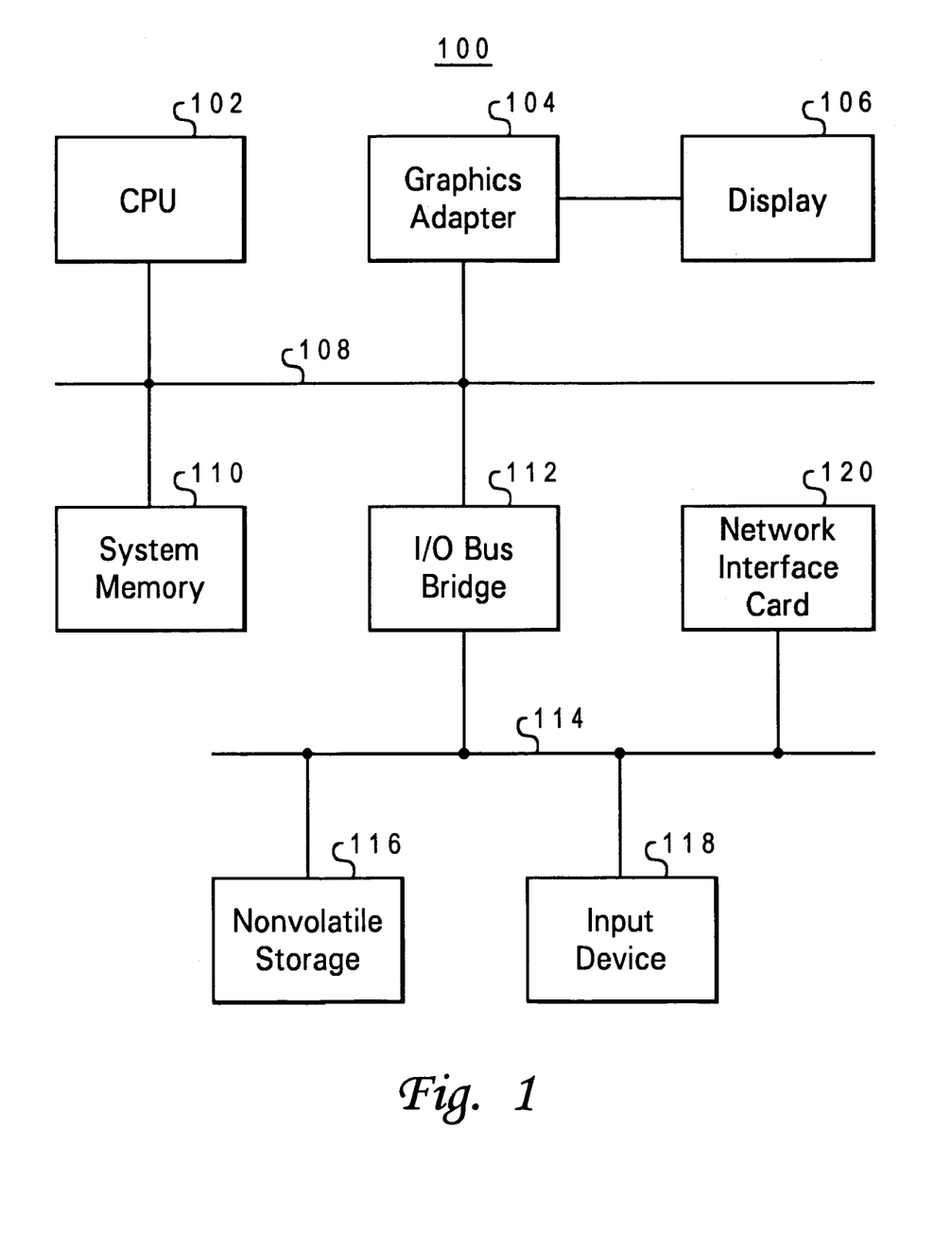
FIG. 1 is a high level block diagram of an exemplary computer system used in the present invention.

With reference now to FIG. 1, there is depicted a block diagram of a data processing system in which a preferred embodiment of the present invention may be implemented. Data processing system 100 may be, for example, one of the models of personal computers available from International Business Machines Corporation of Armonk, N.Y. Data processing system 100 includes a central processing unit (CPU) 102, which is connected to a system bus 108. In the exemplary embodiment, data processing system 100 includes a graphics adapter 104 also connected to system bus 108, for providing user interface information to a display 106. Usually, RDM will be used with more Enterprise Class machines such as a Total Storage Virtual Tape Server.

Also connected to system bus 108 are a system memory 110 and an input/output (I/O) bus bridge 112. I/O bus bridge 112 couples an I/O bus 114 to system bus 108, relaying and/or transforming data transactions from one bus to the other. Peripheral devices such as nonvolatile storage 116, which may be a hard disk drive, and input device 118, which may include a conventional mouse, a trackball, or the like, is connected to I/O bus 114. Network Interface Card 120 allows the system to communicate with computers (not shown) on a Local Area Network (LAN) or Wide Area Network (WAN).

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention.

Figure 2:
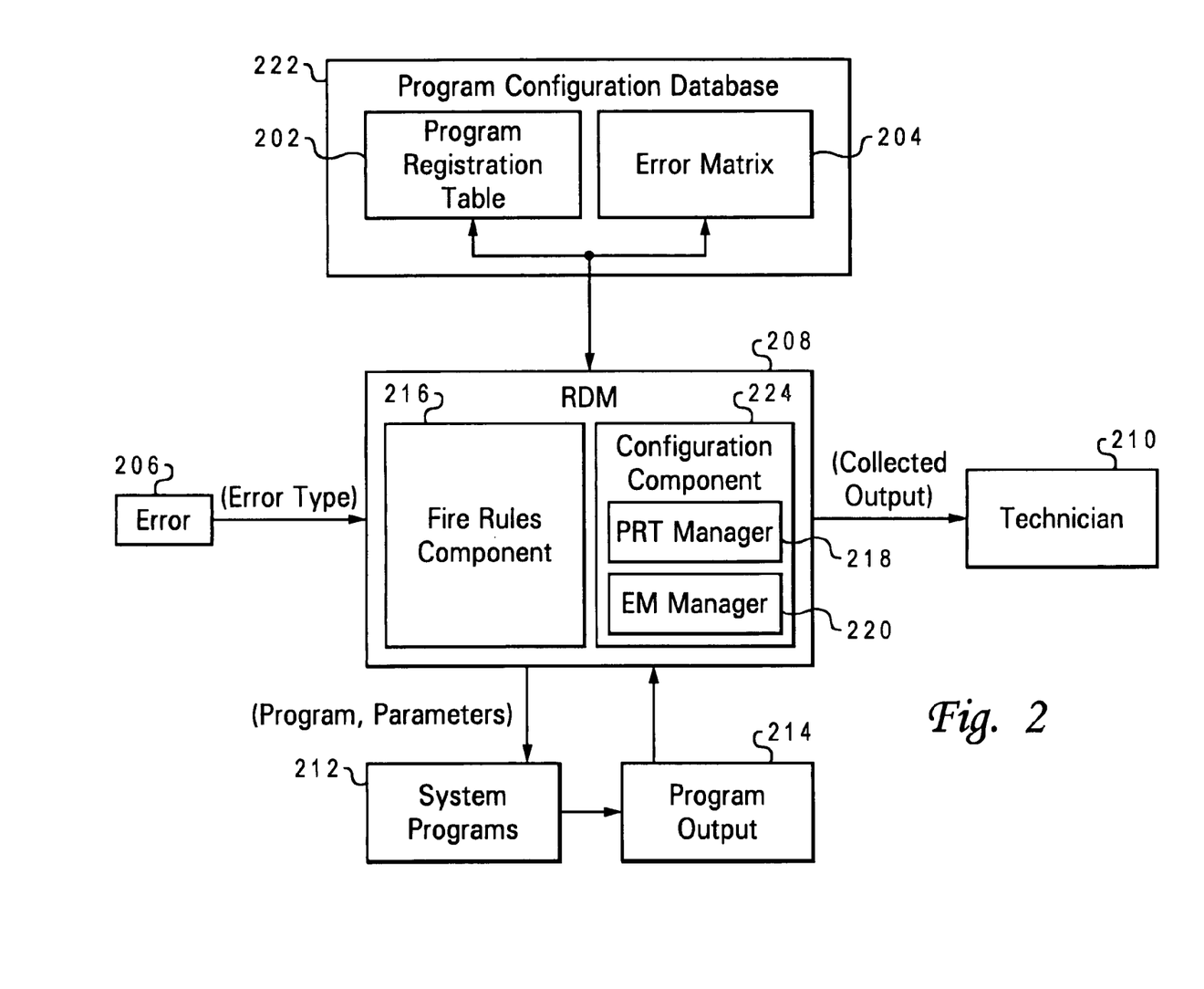
FIG. 2 is a high level block diagram depicting one implementation of the present invention.
Figure 3A:
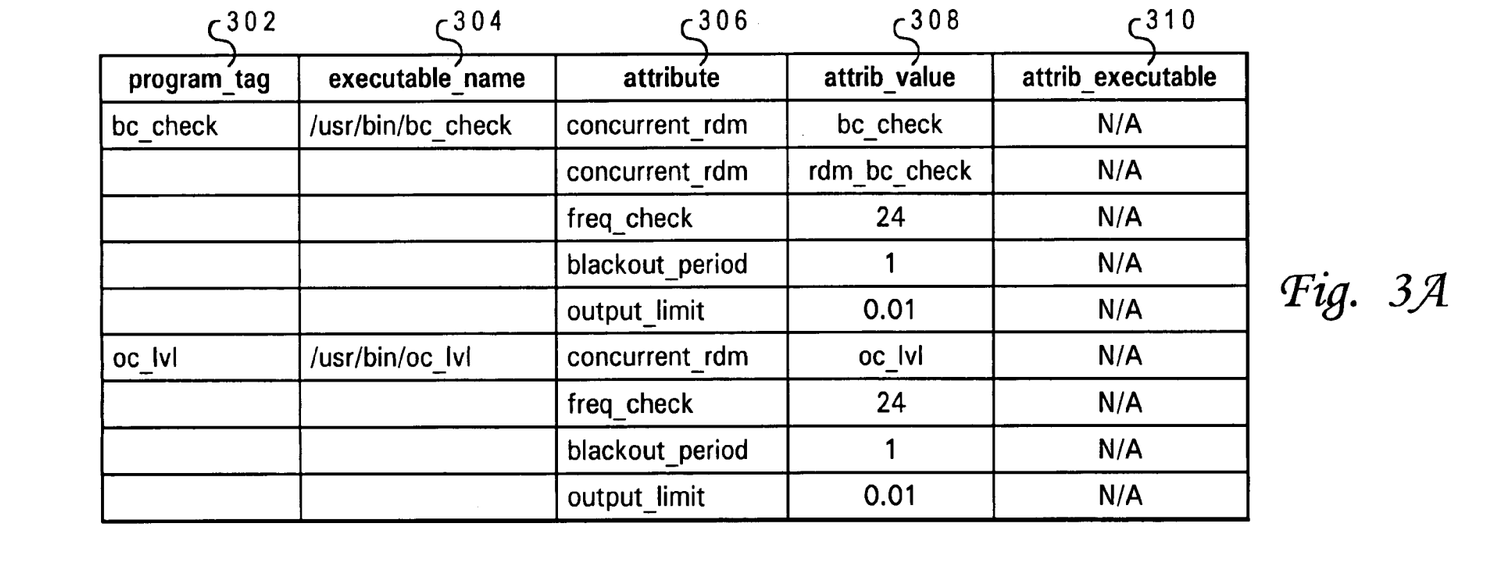
FIG. 3a is a table layout illustrating one possible format for a Program Registration Table.
Figure 3B:
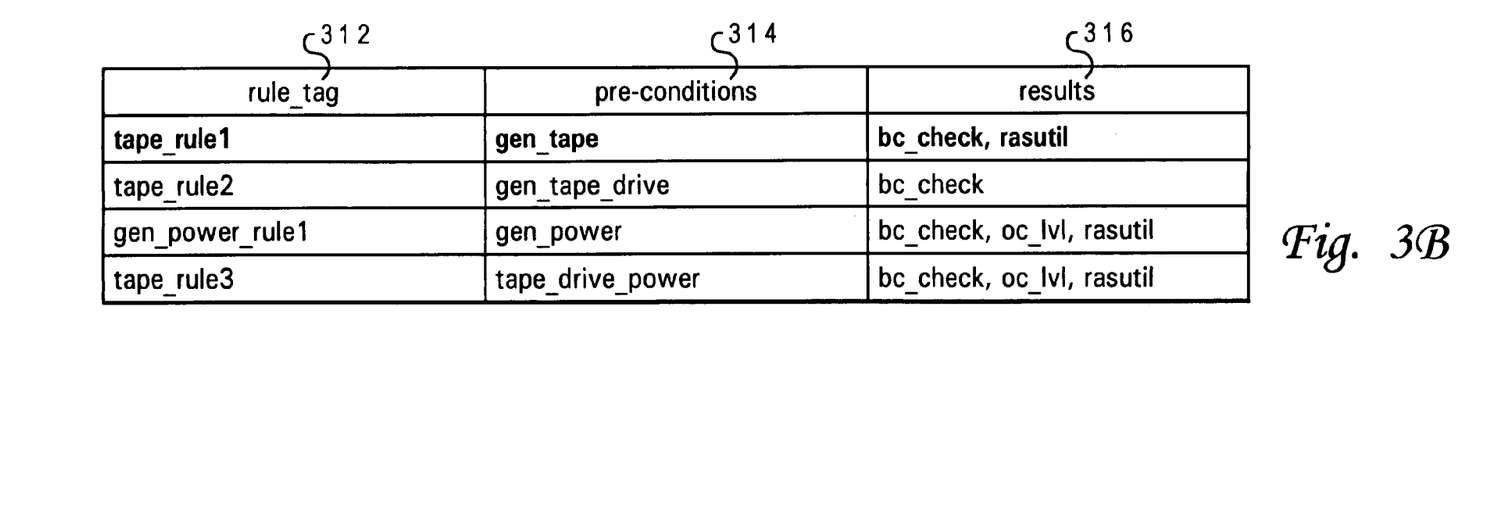
FIG. 3b is a table layout depicting one possible format for an Error Matrix.

Referring now to FIG. 2, a block diagram of a preferred embodiment of the present invention is illustrated. Program Configuration Database 222 is composed of Program Registration Table (PRT) 202 and Error Matrix (EM) 204. Program Configuration Database 222 stores information indicating which actions to take in response to receiving Error 206. The format of PRT 202 and EM 204 will be described in more detail in conjunction with FIG. 3.

Remote Data Manager (RDM) 208 contains Fire Rules Component (FRC) 216 for handling systems errors. Further RDM 208 contains Configuration Component 224 utilized for updating Program Configuration Database 222. The use of Configuration Component 224 and Program Database 222 allows for flexible customization of the behavior of RDM 208 without the need for a user to log into the system or without the need to change the code of RDM 208. The components of RDM 208 will be discussed in greater detail in conjunction with FIG. 5, FIG. 6, and FIG. 7.

In one embodiment of the invention, when RDM 208 receives Error 206 from the system (not depicted), the information about Error 206 is passed to FRC 216. FRC 216 extracts the error type of Error 206 and examines Program Configuration Database 222 to determine which programs to execute in response to Error 206. Specifically, FRC 216 searched Error Matrix 204 to determine which rules (not depicted) match the error type. The rules that match the error type include a field indicating which programs to execute. After determining which rules match, FRC 216 examines PRT 202 for information about the programs that are to be executed.

After the information about the programs is obtained, FRC 216 executes the programs located in System Programs 212 with the appropriate parameters. The programs are only executed if the limits set by the associated program attributes all pass. In other words, if a registered data collection program has an attribute stating that it cannot be executed if a specific other program is currently running, then that particular data collection program will not be run. This minimizes the impact data collection programs have on the system function. Additionally, FRC 216 collects Program Output 214 from the programs executed. FRC 216 then transmits the collected output to Technician 210. Technician 210 maybe an automated system, a technician, or other destination that may utilize the collected data.

RDM 208 also receives update messages (not depicted) that are passed to Configuration Component 224. Configuration Component 224 utilizes the update message to modify Program Configuration Database 222. In one embodiment, Configuration Component 224 determines if the update pertains to PRT 202 or EM 204 and passes the information to PRT Manager 218 or EM Manager 220 as appropriate.

With reference now to FIG. 3, exemplary tables for a PRT and EM are depicted. In a preferred embodiment, PRT contains entries composed of the following fields: program_tag 302, executable_name 304, attribute 306, attrib_value 308, and attrib_executable 310. Program_tag 302 represents a short-form name of a program to execute. Program_tag 302 is utilized to link information between a PRT and an EM. Executable_name 304 contains a string that is utilized to cause a system to execute the program. Attribute 306, attrib_value 308, and attrib_executable store additional information related to the program. The information may include programs which may not be executed concurrently (concurrent_rdm attribute), a limit on the size of the output of a program (output_limit attribute), the number of times a program may be executed within a given time (freq_check attribute), the amount of time which must transpire before a program may be executed again (black_out_period), or any other desired information. The attrib_executable stores a string that is utilized to execute a program that returns a value signifying whether or not the associated registered data collection program is allowed to be executed. This allows flexibility in defining new attribute types that presently are not foreseen, but in the future may arise as being useful to check.

An EM table contains entries containing rule_tag 312, pre-conditions 314, and results 316. Rule_tag 312 serves as a name for a rule. Pre-conditions 314 indicate an expression which triggers a rule. For example, in the event of a "gen_tape" error the precondition for executing "tape_rule1" is met. Results 316 indicates the short name or names of the programs to be executed when the rule is triggered.

Those skilled in the art will readily appreciate that the information stored in the Program Registration Table and an Error Matrix described above may be stored in one table distributed over multiple tables. Further, different sets of fields may be employed to provide the same functionality. Such variations are considered to be within the scope and spirit of the present invention.

Figure 4:
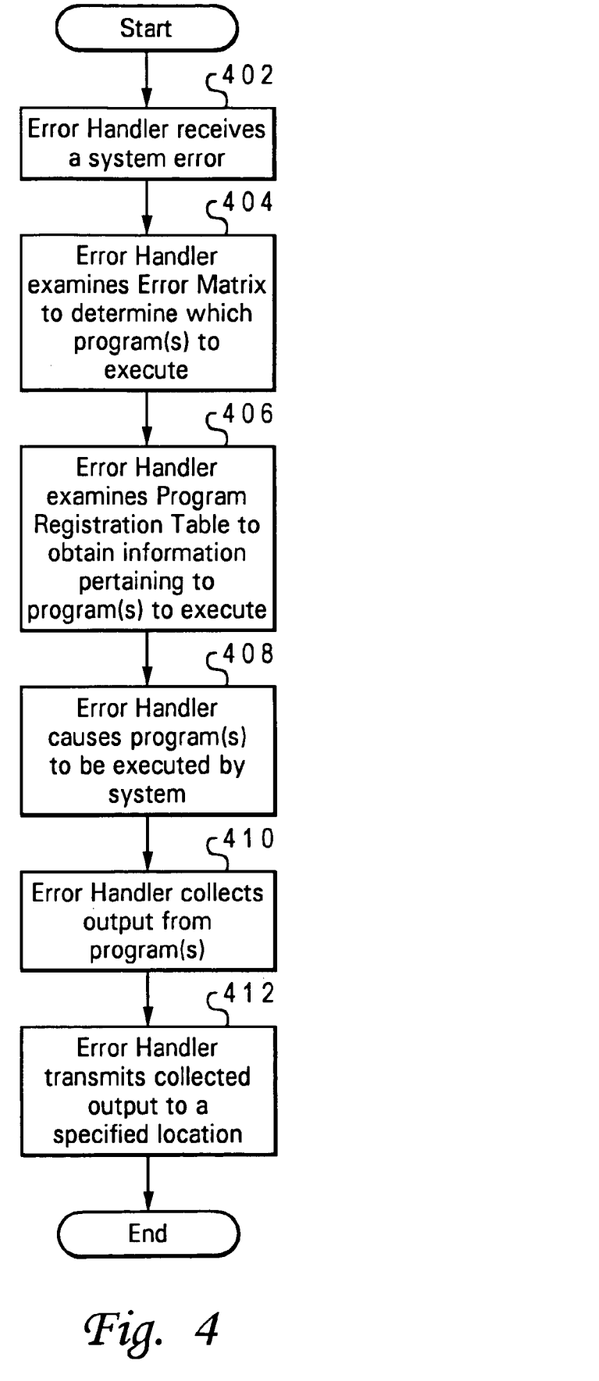
FIG. 4 illustrates a set of steps one embodiment of the invention carries out in response to a system error.

Referring now to FIG. 4, a flow chart of a preferred set of steps to handle system errors in the present invention is illustrated. As depicted at step 402, the process begins when a an Error is received by the RDM. The Error contains a type and may contain additional information about the error. Based on the error type, the RDM searches through the Error Matrix to determine which program or programs to execute as illustrated at step 404. A user may specify the RDM execute all programs that match or only the first.

Once the RDM has determined which program or programs to execute, it examines the Program Registration Table for more information about the program or programs as depicted at step 406. The information includes the location of the executable, parameters to pass when calling the executable, and attributes that must be checked before the program is allowed to be executed. As illustrated at step 408, the RDM causes the selected program or programs to be executed by the system. The programs may be executed sequentially or in parallel, depending on attributes associated with the programs.

The output of the executed program or programs is collected and sent to a specified location once it becomes available as depicted at 412. The collected output may be sent electronically or by other means including facsimile to a specified location.

Figure 5:
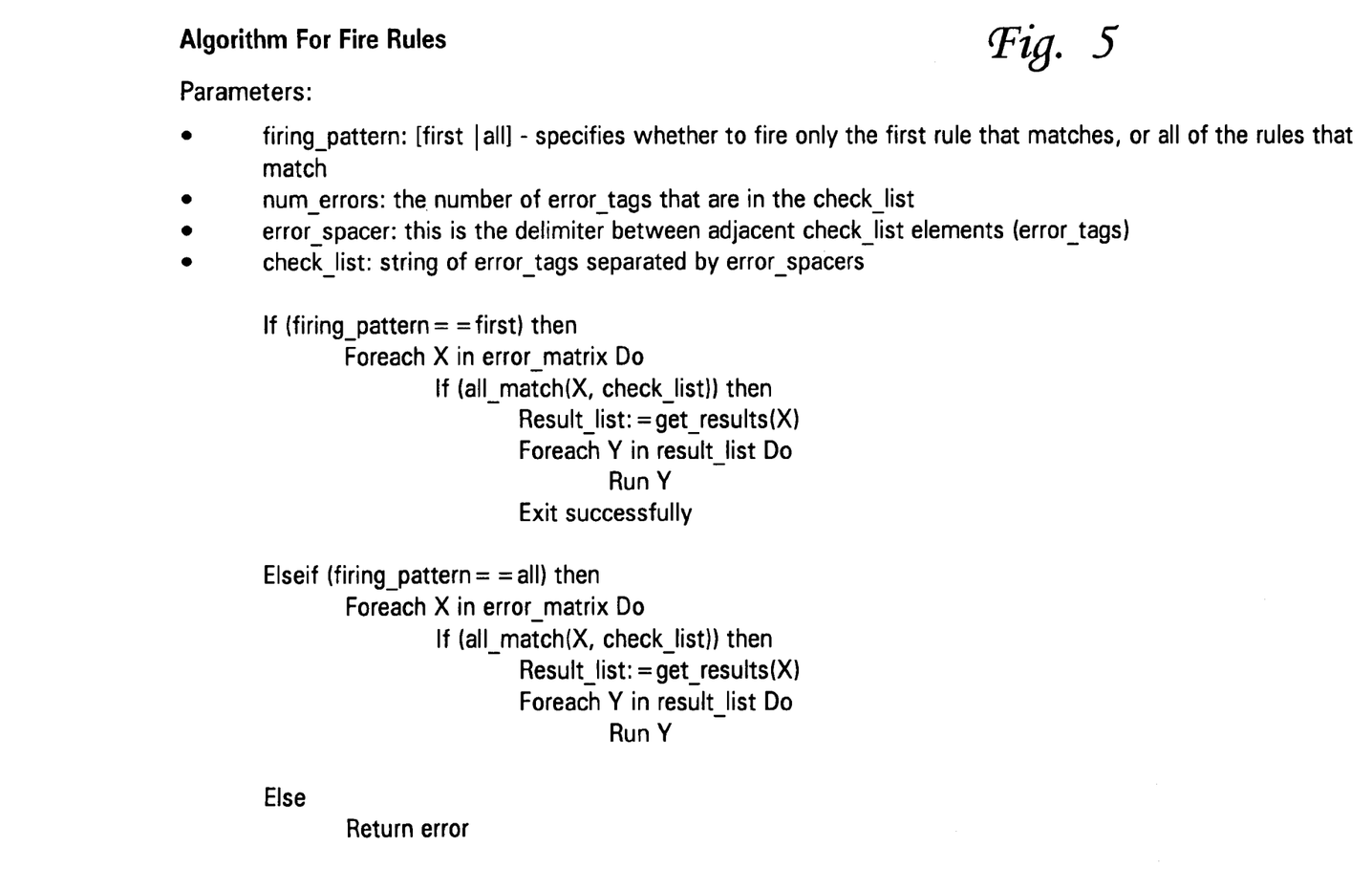
FIG. 5 is a pseudo-code listing describing one means of implementing a Fire Rules Component.

With reference now to FIG. 5, a pseudo-code listing for an exemplary embodiment of the Fire Rules Component (FRC) within the RDM is presented. The FRC receives one or more error messages from a system. Each error messages has an associated type and as in the illustrative embodiment may be represented as simply a type. Additionally, the FRC receives an indicator (firing pattern) specifying if all rules or only the first which matches the error should be executed. The indicator may be stored in a configuration file, specified when initialing the FRC, or by any other means.

If the firing pattern is for executing only the first match, the FRC extracts the first rule from the Error Matrix that is a match. If a match is found, the results (the programs to execute) of the match are run (assuming all attributes for each said program are such that they allow the execution). Afterwards, the FRC exists successfully.

When a firing pattern to execute all matches is specified, the FRC proceeds in a similar manner as described above.

However, instead of exiting after the first match, the FRC continues to search the Error Matrix for matches until it reaches the end of the table.

In addition to code presented, the code could include before the FRC exits, instructions to collect the results, if any, of the program or programs executed and transmitted them to a third party.

Figure 6:
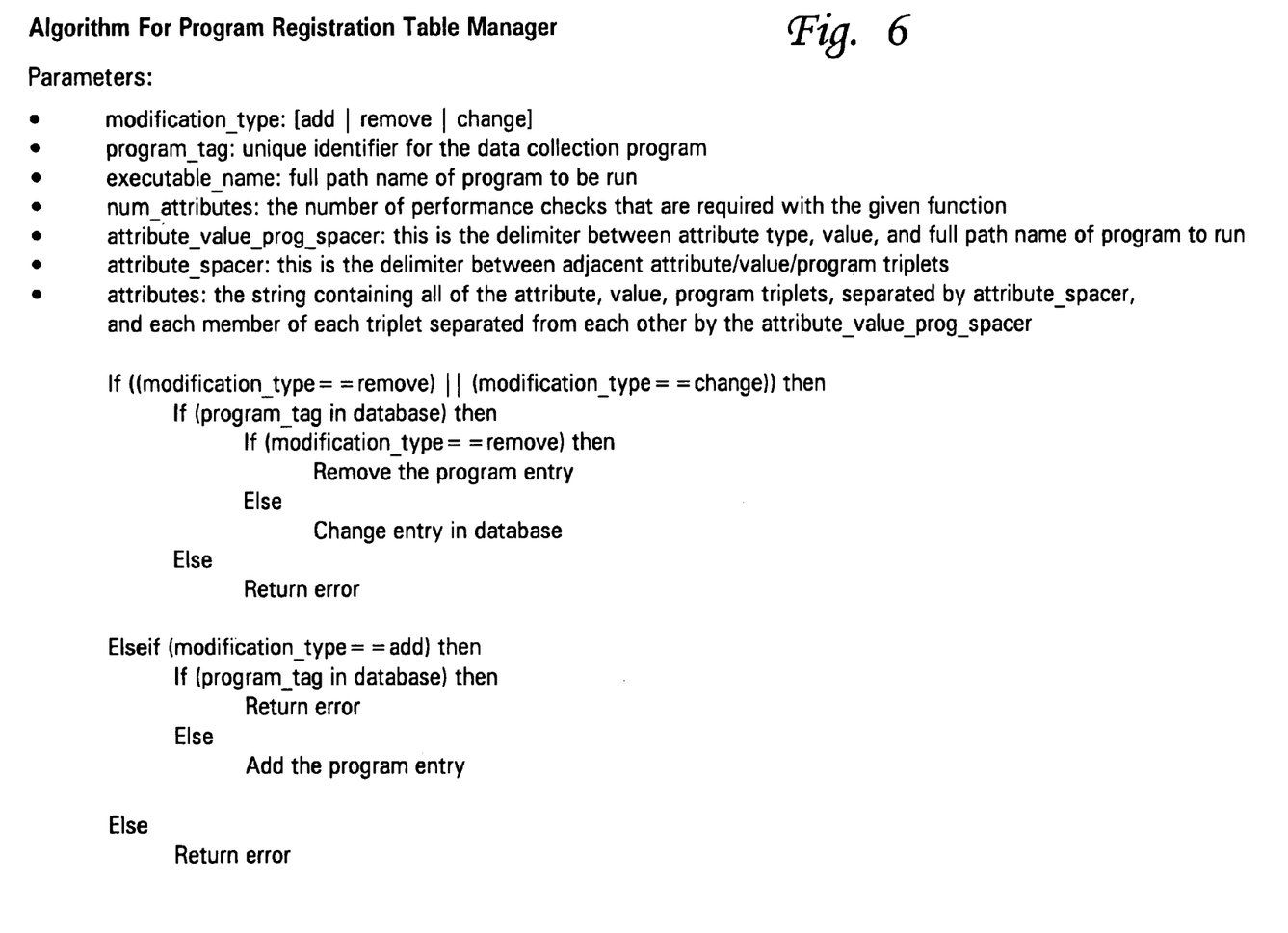
FIG. 6 is a pseudo-code listing describing one means of implementing a Program Registration Table Manager.

Referring now to FIG. 6, a pseudo-code listing for an exemplary embodiment of the Program Registration Table Manager (PRTM) within the RDM is presented. The PRTM allows the behavior of the RDM to be customized after deployment without the need to log into a system or change the code of the RDM. The PRTM may receive messages that originate from different sources. For example, a user of a system may utilize a local configuration tool or offsite personnel may send an electronic message to the PRTM.

Regardless of the origin of the update message, the update message must contain enough information as to allow the PRTM to perform an update. In an exemplary embodiment, the update message contains data indicating the modification type (add, delete, update), a program tag, an executable name, and attribute fields. The pseudo-code listing in FIG. 6 illustrates a set of steps that may be taken when given the above information to update the PRT.

Figure 7:
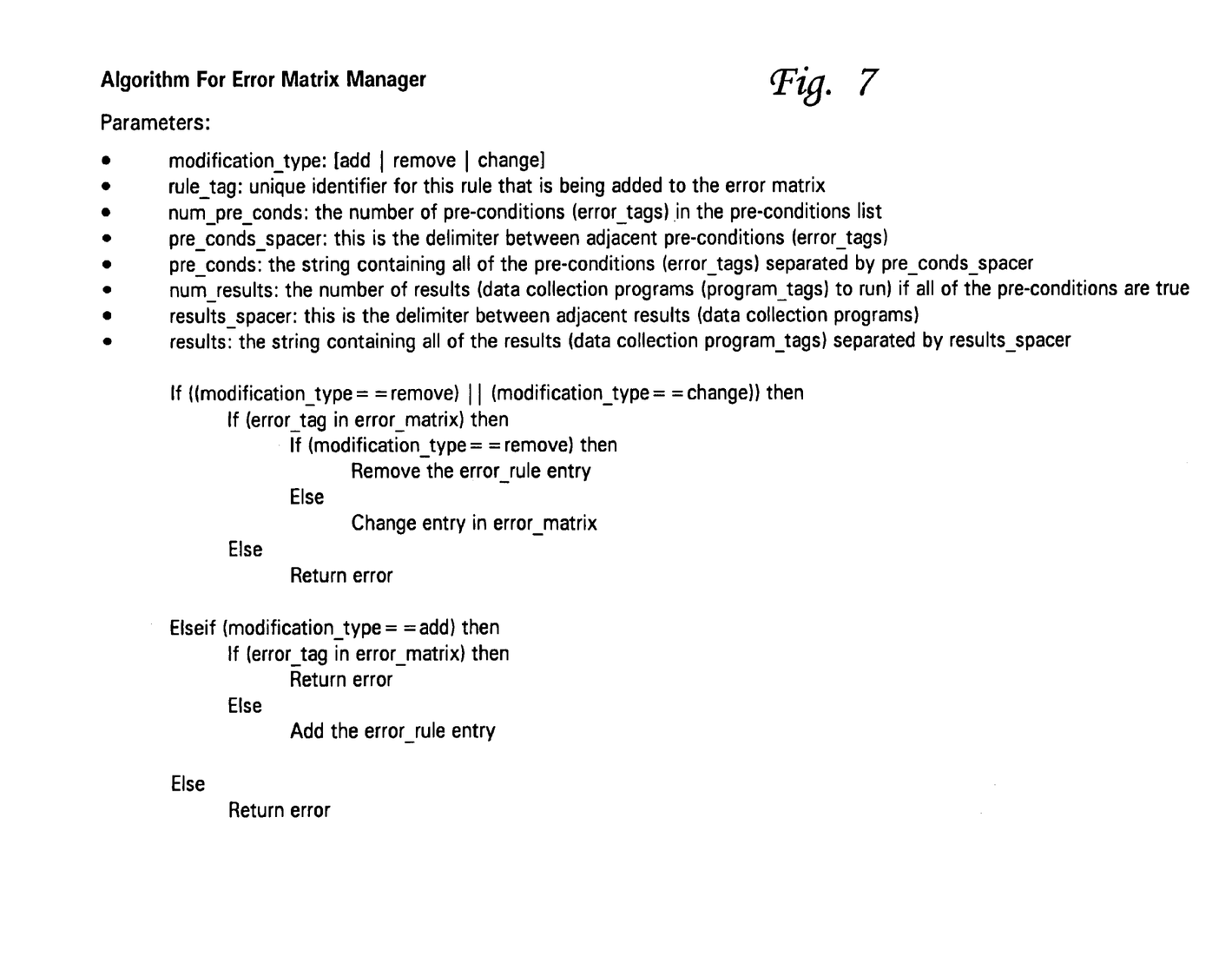
FIG. 7 is a pseudo-code listing describing one means of implementing an Error Matrix Manager.

With reference now to FIG. 7, a pseudo-code listing for an exemplary embodiment of the Error Matrix Manager (EMM) within the RDM is presented. The EMM allows the behavior of the RDM to be customized after deployment without the need to log into a system or change the code of the RDM. The EMM may receive messages that originate from different sources. For example, a user of a system may utilize a local configuration tool or offsite personnel may send an electronic message to the EMM.

A preferred format of an update message for an EMM, as used with the pseudo-code of FIG. 7, includes a modification type, a rule tag, data describing preconditions for the rule, and data describing results for the rule. The pseudo-code listing in FIG. 7 illustrates a set of instructions that maybe utilized in conjunction with an update message containing the information described above to perform an EM update.

The present invention has been described in relation to particular embodiments which are intended in all respects to be illustrative rather than restrictive. Alternative embodiments will become apparent to those skilled in the art to which the present invention pertains without departing from its spirit and scope. For example, while the present invention has been described as receiving a system error, the present invention may be utilized to respond to an system event. The term system error includes within its meaning any system event. Accordingly, the scope of the present invention is defined by the appended claims rather than the foregoing discussion.

What is claimed is:

1. A system comprising:
  a program configuration database to store data specifying a data collection program within an associated data processing system;
  a remote data manager module coupled with said program configuration database comprising
    means for detecting an occurrence of a system error within said associated data processing system,
    means for determining an error type of said system error,
    means for identifying said data collection program utilizing said program configuration database and said error type, and
    means for executing said data collection program in response to an identification thereof; and
  a configuration module coupled with said remote data manager module to receive an update message and to update said program configuration database utilizing said update message, wherein said update message comprises data specifying a program tag, an executable name, and an attribute.

2. The system of claim 1, wherein said program configuration database further comprises:
  a program registration table, comprising one or more program registration table entries; and
  an error matrix, comprising one or more error matrix entries.

3. The system of claim 2, wherein said configuration module further comprises at least one of:
  a program registration table manager, and
  an error matrix manager.

4. The system of claim 2, wherein said program registration table comprises program registration table entries each comprising:
  a program tag field;
  an executable name field;
  an attribute field; and
  an attribute value field.

5. The system of claim 2, wherein said error matrix comprises error matrix entries each comprising:
  an error tag field;
  a precondition field; and
  a result field.

6. The system of claim 1, wherein said remote data manager module further comprises:
  means for transmitting program output of said data collection program from said associated data processing system to a remote server.

7. The system of claim 1, wherein said update message is received from a remote server.

8. A method comprising:
  maintaining a program configuration database within a data processing system, wherein said maintaining comprises
    storing data specifying a data collection program within said program configuration database;
    receiving an update message at said data processing system, wherein said update message comprises data specifying a program tag, an executable name, and an attribute; and
    updating said program configuration database utilizing said update message in response to said receiving;
  detecting an occurrence of a system error within said data processing system;
  identifying said data collection program utilizing said program configuration database in response to said detecting; and
  executing said data collection program in response to said identifying.

9. The method of claim 8, wherein said program configuration database further comprises:
  a program registration table, comprising one or more program registration table entries; and
  an error matrix, comprising one or more error matrix entries.

10. The method of claim 8, said method further comprising:
  transmitting program output of said data collection program from said data processing system to a remote server.

11. The method of claim 8, wherein said maintaining further comprises:
   maintaining said program configuration database utilizing at least one of a program registration table manager and an error matrix manager.

12. The method of claim 8, wherein said receiving further comprises:
   receiving said update message from a remote server.

13. The method of claim 8, wherein
   said method further comprises
      determining an error type of said system error, and
   said identifying comprises
      identifying said data collection program utilizing said error type.

14. A computer-readable medium encoded with a computer program, which when executed by a processor, causes said processor to perform a method comprising:
   maintaining a program configuration database within a data processing system, wherein said maintaining comprises
      storing data specifying a data collection program within said program configuration database;
   receiving an update message at said data processing system, wherein said update message comprises data specifying a program tag, an executable name, and an attribute; and
      updating said program configuration database utilizing said update message in response to said receiving;
   detecting an occurrence of a system error within said data processing system;
   identifying said data collection program utilizing said program configuration database in response to said detecting; and
   executing said data collection program in response to said identifying.

15. The computer-readable medium of claim 14, wherein said program configuration database further comprises:
   a program registration table, comprising one or more program registration table entries; and
   an error matrix, comprising one or more error matrix entries.

16. The computer-readable medium of claim 14, said method further comprising:
   transmitting program output of said data collection program from said data processing system to a remote server.

17. The computer-readable medium of claim 14, wherein said maintaining further comprises:
   maintaining said program configuration database utilizing at least one of a program registration table manager and an error matrix manager.

18. The computer-readable medium of claim 14, wherein said method further comprises
   determining an error type of said system error, and
   said identifying comprises
      identifying said data collection program utilizing said error type.

* * * * *